United States Patent
Crockett et al.

(10) Patent No.: US 7,450,701 B2
(45) Date of Patent: **\*Nov. 11, 2008**

(54) METHOD AND SYSTEM FOR PRESENTING CUSTOMIZED CALL ALERTS IN A SERVICE FOR INTERNET CALLER IDENTIFICATION

(75) Inventors: Susanne Marie Crockett, Buffalo Grove, IL (US); Gordon Lynn Blumenschein, Woodridge, IL (US); James Daniel Kovarik, Batavia, IL (US); Kenneth Robert Stroud, Lago Vista, TX (US); Dianna Inara Tiliks, Elk Grove, IL (US); William R. Trost, Mequon, WI (US); Paul H. Vlasek, Brookfield, IL (US); Scott Ryan Watry, Greenfield, WI (US); Thomas Joseph McBlain, Arlington Heights, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 523 days.

This patent is subject to a terminal disclaimer.

(21) Appl. No.: 10/778,067

(22) Filed: Feb. 17, 2004

(65) Prior Publication Data

US 2004/0161083 A1    Aug. 19, 2004

Related U.S. Application Data

(63) Continuation of application No. 10/076,525, filed on Feb. 19, 2002, now Pat. No. 6,718,021.

(51) Int. Cl.
*H04M 11/00* (2006.01)
(52) U.S. Cl. ............ 379/93.23; 379/90.01; 379/142.15; 379/373.04

(58) Field of Classification Search ............ 379/93.23, 379/90.01, 93.35, 93.17, 93.01, 142.01, 142.02, 379/142.06–142.08, 142.15, 373.02, 373.04; 370/352

See application file for complete search history.

(56) References Cited

U.S. PATENT DOCUMENTS 3,934,079 A    1/1976    Barnhart (Continued)

FOREIGN PATENT DOCUMENTS

BR    8603764    5/1988

(Continued)

OTHER PUBLICATIONS

CC Docket No. 92-105, Federal Communications Commission (FCC Docket), Sep. 8, 1999.

(Continued)

*Primary Examiner*—Stella L Woo
(74) *Attorney, Agent, or Firm*—Greenblum & Bernstein, P.L.C.

(57) ABSTRACT

An advanced intelligent network (AIN) based system and method that allows a subscriber connected to the Internet to receive customized call alerts and caller identification information concerning an incoming telephone call. Using client software, the subscriber associates telephone numbers to sound files. Then, when an incoming call with caller identification information is received, the client software determines whether the incoming telephone number points to a sound file. If so, the client software directs the sound file to play.

19 Claims, 6 Drawing Sheets

U.S. PATENT DOCUMENTS

| | | |
|---|---|---|
| 4,191,860 A | 3/1980 | Weber |
| 4,313,035 A | 1/1982 | Jordan et al. |
| 4,338,492 A | 7/1982 | Snopko |
| 4,349,701 A | 9/1982 | Snopko |
| 4,356,509 A | 10/1982 | Skerlos et al. |
| 4,405,946 A | 9/1983 | Knight et al. |
| 4,456,925 A | 6/1984 | Skerlos et al. |
| 4,582,956 A | 4/1986 | Doughty |
| 4,611,094 A | 9/1986 | Asmuth et al. |
| 4,611,096 A | 9/1986 | Asmuth et al. |
| 4,756,020 A | 7/1988 | Fodale |
| 4,757,267 A | 7/1988 | Riskin |
| 4,788,718 A | 11/1988 | McNabb et al. |
| 4,802,199 A | 1/1989 | Lange et al. |
| 4,805,205 A | 2/1989 | Faye |
| 4,805,210 A | 2/1989 | Griffith, Jr. |
| 4,852,151 A | 7/1989 | Dittakavi et al. |
| 4,873,719 A | 10/1989 | Reese |
| 4,899,373 A | 2/1990 | Lee et al. |
| 4,922,523 A | 5/1990 | Hashimoto |
| 4,924,496 A | 5/1990 | Figa et al. |
| 4,974,085 A | 11/1990 | Campbell et al. |
| 4,989,081 A | 1/1991 | Miyagawa et al. |
| 4,995,074 A | 2/1991 | Goldman et al. |
| 5,029,199 A | 7/1991 | Jones et al. |
| 5,046,079 A | 9/1991 | Hashimoto |
| 5,046,093 A | 9/1991 | Wachob |
| 5,054,055 A | 10/1991 | Hanle et al. |
| 5,061,992 A | 10/1991 | Ueno |
| 5,073,927 A | 12/1991 | Grube |
| 5,083,205 A | 1/1992 | Arai |
| 5,099,331 A | 3/1992 | Truong |
| 5,109,279 A | 4/1992 | Ando |
| 5,117,452 A | 5/1992 | Callele et al. |
| 5,138,649 A | 8/1992 | Krisbergh et al. |
| 5,148,275 A | 9/1992 | Blatter et al. |
| 5,247,571 A | 9/1993 | Kay et al. |
| 5,315,641 A | 5/1994 | Montgomery et al. |
| 5,333,183 A | 7/1994 | Herbert |
| 5,343,516 A | 8/1994 | Callele et al. |
| 5,353,331 A | 10/1994 | Emery et al. |
| 5,467,388 A | 11/1995 | Redd, Jr. et al. |
| 5,469,500 A | 11/1995 | Satter et al. |
| 5,491,744 A | 2/1996 | Kikinis |
| 5,513,251 A | 4/1996 | Rochkind et al. |
| 5,519,767 A | 5/1996 | O'Horo et al. |
| 5,524,146 A | 6/1996 | Morrisey et al. |
| 5,533,102 A | 7/1996 | Robinson et al. |
| 5,546,447 A | 8/1996 | Skarbo et al. |
| 5,559,855 A | 9/1996 | Dowens et al. |
| 5,559,856 A | 9/1996 | Dowens et al. |
| 5,559,857 A | 9/1996 | Dowens et al. |
| 5,574,776 A | 11/1996 | Leuca et al. |
| 5,581,604 A | 12/1996 | Robinson et al. |
| 5,625,676 A | 4/1997 | Greco et al. |
| 5,651,060 A | 7/1997 | Cohn et al. |
| 5,680,443 A | 10/1997 | Kasday et al. |
| 5,684,862 A | 11/1997 | Finnigan |
| 5,696,815 A | 12/1997 | Smyk |
| 5,724,412 A | 3/1998 | Srinivasan |
| 5,734,705 A | 3/1998 | Schlossman et al. |
| 5,764,748 A | 6/1998 | Rosenthal et al. |
| 5,793,853 A | 8/1998 | Sbisa |
| 5,805,587 A | 9/1998 | Norris et al. |
| 5,805,677 A | 9/1998 | Ferry et al. |
| 5,805,682 A | 9/1998 | Voit et al. |
| 5,809,112 A | 9/1998 | Ryan |
| 5,809,128 A | 9/1998 | McMullin |
| 5,825,862 A | 10/1998 | Voit et al. |
| 5,835,583 A | 11/1998 | Hetz et al. |
| 5,867,562 A | 2/1999 | Scherer |
| 5,883,943 A | 3/1999 | Siddiqui |
| 5,915,008 A | 6/1999 | Dulman |
| 5,917,817 A | 6/1999 | Dunn et al. |
| 5,917,888 A | 6/1999 | Giuntoli |
| 5,933,490 A | 8/1999 | White et al. |
| 5,937,050 A | 8/1999 | Yue et al. |
| 5,940,485 A | 8/1999 | Sapra et al. |
| 5,946,381 A | 8/1999 | Danne et al. |
| 5,982,774 A | 11/1999 | Foladare et al. |
| 5,999,611 A | 12/1999 | Tatchell et al. |
| 6,014,379 A | 1/2000 | White |
| 6,028,917 A | 2/2000 | Creamer et al. |
| 6,031,896 A | 2/2000 | Gardell et al. |
| 6,052,444 A | 4/2000 | Ferry et al. |
| 6,078,581 A | 6/2000 | Shtivelman et al. |
| 6,078,583 A | 6/2000 | Takahara et al. |
| 6,081,517 A * | 6/2000 | Liu et al. .................. 370/352 |
| 6,081,589 A | 6/2000 | Jiang et al. |
| 6,097,795 A | 8/2000 | Ungruh et al. |
| 6,101,246 A | 8/2000 | Heinmiller et al. |
| 6,104,800 A | 8/2000 | Benson |
| 6,125,126 A | 9/2000 | Hallenstal |
| 6,144,644 A | 11/2000 | Bajzath |
| 6,178,232 B1 | 1/2001 | Latter et al. |
| 6,205,213 B1 | 3/2001 | Kucmerowski et al. |
| 6,212,261 B1 | 4/2001 | Meubus et al. |
| 6,219,413 B1 | 4/2001 | Burg |
| 6,219,414 B1 | 4/2001 | Maciewski et al. |
| 6,259,692 B1 | 7/2001 | Shtivelman et al. |
| 6,278,771 B1 | 8/2001 | Crockett et al. |
| 6,282,267 B1 | 8/2001 | Nolting |
| 6,317,488 B1 | 11/2001 | DePond et al. |
| 6,366,661 B1 | 4/2002 | Devillier et al. |
| 6,418,214 B1 | 7/2002 | Smythe et al. |
| 6,434,226 B1 | 8/2002 | Takahashi |
| 6,570,983 B1 | 5/2003 | Speeney et al. |
| 6,665,388 B2 * | 12/2003 | Bedingfield ............ 379/142.01 |
| 6,697,470 B2 * | 2/2004 | McDonough .......... 379/142.06 |
| 6,718,021 B2 * | 4/2004 | Crockett et al. .......... 379/93.23 |
| 2002/0031207 A1 | 3/2002 | Lin |
| 2002/0090074 A1 | 7/2002 | Sbisa et al. |
| 2002/0094070 A1 | 7/2002 | Mott et al. |
| 2002/0107049 A1 | 8/2002 | Maquaire et al. |
| 2002/0165969 A1 | 11/2002 | Gallant |
| 2003/0002650 A1 | 1/2003 | Gruchala et al. |
| 2004/0032946 A1 | 2/2004 | Koser et al. |
| 2004/0240651 A1* | 12/2004 | Adams et al. .......... 379/142.08 |

FOREIGN PATENT DOCUMENTS

| | | |
|---|---|---|
| EP | 0380315 | 8/1990 |
| EP | 0740480 | 10/1996 |
| FR | 2305078 | 10/1976 |
| FR | 2320670 | 3/1977 |
| GB | 2193419 | 2/1988 |
| GB | 2223911 | 4/1990 |
| JP | 1-78059 | 3/1989 |
| JP | 64-78059 | 3/1989 |
| JP | 1-91560 | 4/1989 |
| JP | 2-113657 | 4/1990 |
| JP | 2-202278 | 8/1990 |
| JP | 2-299361 | 12/1990 |
| JP | 3-29456 | 2/1991 |
| WO | 98/52342 | 11/1998 |

OTHER PUBLICATIONS

J. Keating et al., "Telecommunications Relay Services and Speech-to-Speech Services for Individuals with Hearing and Speech Disabilities", Sep. 1998.

M.T. Breslin, "Re: CC Docket No. 92-105, DA 99-1170, 711 Access to Telecommunications Relay Services", Aug. 2, 1999.

K. Peltz-Strauss, "Re: FCC Public Forum on 711 Access to Telecommunications Relay Services—Ex Parte Comments CC Dkt No. 92-105", Aug. 2, 1999.

N. Moy, Re: Ex Parte Presentation CC Docket No. 92-105, Jul. 30, 1999.

Bell Atlantic, Easier Calling for Deaf and Hard of Hearing, Jul. 1998, http://gohear.org/tech/bell.html.

Notes from Nov. 15, 2000 7-1-1 Technical Conference, http://www.icc.state.il.us/tc/docs/001121711notes.doc.

"Caller EyeDee," by Dazil Internet Services, printed on Dec. 13, 2001.

"Internet Call Manager—It's For You," printed on Dec. 13, 2001.

Internet Caller ID—Call Waiting Manager (ICWM), by Computer Peripheral Systems, Inc., printed on Dec. 10, 2001.

Bellcore Technical Reference TR-NWT-000283, Issue 2, "Simplified Message Desk Interface (SMDI) Generic Requirements," (May 1991).

Consumer Information Appliance; p. 8, Published by Jupiter Communications; Oct. 1991.

D. Wachob. "Consumer-Friendly Cable/Telco Intergration: Today and Tomorrow," Communication Technology, Oct. 1991.

Advertising Brochure for Class Mate 10, 1989.

J. Quain. "Why a Monitor Isn't a TV", PC Magazine, May 14, 1991, pp. 352-353.

Bellcore Publication TR-TSSY-000 31, "Class (sm) Feature: Calling Number Delivery", Issue 3, Jan. 1990.

Opinion of Dec. 3, 1987, *United States* v. *Western Electric Company*, (DDC. 1987), Civil Action No. 82-0192.

Modification of Final Judgment, *United States* v. *Western Electric Company* (DDC. 1992), Civil Action No. 82-0192.

Class Mates Systems Corporation Brochure, Mar. 1, 1990.

McGraw-Hill Electronics Dictionary, p. 356, (5th ed 1994) by John Markus & Neil Sclater.

MHE Class Mate 10 and the Rochelle Communications Publications Caller ID plus line Plus sytems (pp. 7 and 8 of a Jupiter Communications Publication; Jan./Feb. 1991).

Bergman, Roger K., and Brewster, John H., "Perspective on the AIN Architecture," IEEE Communications Magazine, Feb. 1992, pp. 27-32.

"Class Calling Name Delivery Generic Requirements FSD 01-02-1070," LATA Switching Systems Generic Requirements, Bell Communications Research, Technical Reference TR-NWT-001188, Issue 1 (Dec. 1991).

"Switching System Requirements for Call Control Using the Integrated Services Digital Network User Part (ISDNUP)," Bell Communications Research, Technical Reference TR-TSY-000317, Issue 2 (Jan. 1989).

"Class Feature: Selective Call Acceptance," Bell Communications Research, Technical Advisory TA-TSY-001034, Issue 1 (Apr. 1990).

"Class Feature: Distinctive Ringing / Call Waiting," Bell Communications Research, Technical Reference TR-TSY-000219, Issue 2 (Aug. 1988).

"Class Feature: Calling Number Delivery FSD-01-02-1051," Bell Communications Research, Technical Reference TR-TSY-000031, Issue 3 (Jan. 1990).

"ISDN Call Forwarding," Bell Communications Research, Technical Reference TR-TSY-000853, Issue 1 (Dec. 1988).

"ISDN Call Forwarding, Revision 1," Bell Communications Research, Technical Reference TR-TSY-000853, Revision 1 (Dec. 1993).

"Generic Requirements for ISDN Automatic Recall," Bell Communications Research, Technical Reference TR-NWT-001199, Issue 1 (Feb. 1992).

"Class Feature: Automatic Recall FSD 01-02-1260," Bell Communications Research, Technical Reference TR-NWT-000227, Issue 3 (Jun. 1993).

"Class Feature: Automatic Callback FSD 01-02-1250," Bell Communications Research, Technical Reference TR-NWT-000215, Issue 3 (Jun. 1993).

InfoInterActive Inc. Internet Call Manager, printed on Mar. 2, 1999.

English Language Abstract of JP 3-29456.
English Language Abstract of JP 64-78059.
English Language Abstract of JP2-202278.
English Language Abstract of JP 2-113657.
English Language Abstract of FR 2305078.
English Language Abstract of FR 2320670.
English Language Abstract of JP 1-78059.
English Language Abstract of JP 1-91560.
English Language Abstract of JP 2-299361.

Bellcore Technical Reference TR-NWT-000283, Issue 2, "Simplified Message Desk Interface (SMDI) Generic Requirement," (May 1991).

Consumer Information Appliance; p. 8, Published by Jupiter Communications; Oct. 1991.

D. Wachob. "Consumer-Friendly Cable/Telco Integration: Today and Tomorrow," Communicaiton Technology, Oct. 1991. Technology, Oct. 1991.

Advertising Brochure for Class Mate 10, 1989.

Specification Description for MOS integrated circuit u PD 6141.

J. Quain. "Why a Monitor Isn't a TV", PC Magazine, May 14, 1991, pp. 352-353.

Bellcore Publication TR-TSSY-000 31, "Class (sm) Feature: Calling Number Delivery", Issue 3, Jan. 1990.

Opinion of Dec. 3, 1987, *United States* v. *Western Electric Company*, (DDC. 1987) Civil Action No. 82-0192.

Modification of Final Judgment, *United States* v. *Western Electric Company* (DDC. 1992), Civil Action No. 82-0192.

Class Mate Systems Corporation Brochure, Mar. 1, 1990.

McGraw-Hill Electronics Dictionary, p. 356, (5th ed 1994) by John Markus & Neil Sclater.

MHE Class Mate 10 and the Rochelle Communications Publications Caller ID plus line Plus sytems (pp. 7 and 8 of a Jupiter Communications Publication; Jan./Feb. 1991).

Bergman, Roger K., and Brewster, John H., "Perspective on the AIN Architecture," IEEE Communications Magazine, Feb. 1992, pp. 27-32.

"CLASS Calling Name Delivery Generic Requirements FSD 01-02-1070," LATA Switching Systems Generic Requirements, Bell Communications Research, Technical Reference TR-NWT-001188, Issue 1 (Dec. 1991);.

"Switching System Requirements for Call Control Using the Integrated Services Digital Network User Part (ISDNUP)," Bell Communicaitons Research, Technical Reference TR-TSY-000317, Issue 2 (Jan. 1989).

* cited by examiner

Sound File Assignment Directory
Pat Greene: Account # (312)555-5831

| Name | Telephone Number | Sound File |
|---|---|---|
| Jane Doe (home) | 214-987-1234 | mom.wav |
| Jane Doe (work) | 214-987-5678 | mom.wav |
| Jack Smith | 928-428-3298 | jack.wav |
| Sally Lee | 713-226-1284 | birds.wav |
| Elaine Miller | 512-555-7946 | trumpet.wav |
| unavailable | unavailable | unavailable.wav |
| privacy manager | privacy manager | privacymanager.wav |

FIG. 4

Caller ID Log
Pat Greene: Account # (312)555-5831

| Name | Telephone Number | Date | Time | Disposition | Sound File |
|---|---|---|---|---|---|
| Jane Doe | 214-987-1234 | 12/17/01 | 08:25 AM | accepted | mom.wav |
| Jack Smith | 928-428-3298 | 12/17/01 | 06:30 AM | forwarded | jack.wav |
| Sally Lee | 713-226-1284 | 12/16/01 | 07:45 PM | accepted | birds.au |
| Elaine Miller | 512-555-7946 | 12/15/01 | 08:31 AM | voice mail | trumpet.wav |
| unavailable | unavailable | 12/14/01 | 09:27 PM | ignored | unavailable.wav |

METHOD AND SYSTEM FOR PRESENTING CUSTOMIZED CALL ALERTS IN A SERVICE FOR INTERNET CALLER IDENTIFICATION

CROSS-REFERENCE TO RELATED APPLICATION

This application is a continuation of U.S. patent application Ser. No. 10/076,525, filed on Feb. 19, 2002 now U.S. Pat. No. 6,718,021, the content of which is incorporated by reference herein in its entirety.

BACKGROUND OF THE INVENTION

1. Field of the Invention

The present invention relates to the field of telecommunications. More particularly, the present invention relates to a telecommunications system for allowing a subscriber connected to the Internet to receive customized audible alerts concerning an incoming telephone call.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

Advanced Intelligent Network (AIN)
Asymmetric Digital Subscriber Line (ADSL)
Central Office (CO)
Called Party Number (CDN)
Calling Party Number (CPN)
Compact Service Node (CSN)
Customer Name (CNAME)
Customer Premises Equipment (CPE)
Digital Subscriber Line (DSL)
Directory Number (DN)
High Bit-Rate Digital Subscriber Line (HDSL)
Internet Caller Identification (ICID)
Internet Service Provider (ISP)
Line Information Database (LIDB)
Numbering Plan Area-Central Office Code (NPA-NXX)
Personal Computer (PC)
Personal Identification Number (PIN)
Point-to-Point Protocol (PPP)
Public Switched Telephone Network (PSTN)
Real Time Database (RTDB)
Registration Server (RS)
Service Control Point (SCP)
Service Switching Point (SSP)
Session Initiation Protocol (SIP)
Signaling System 7 (SS7)
Signaling Transfer Point (STP)
Terminating Attempt Trigger (TAT)
Transactional Capabilities Application Part (TCAP)
Transmission Control Protocol/Internet Protocol (TCP/IP)
User Agent Server (UAS)
Wide Area Network (WAN)

3. Description of Background Information

Various attempts have been made at providing Internet caller identification (ICID) services. Typically, a subscriber of Internet caller ID receives the telephone number and name (if available) of a calling party, while the subscriber is on an active Internet session. The caller ID information is provided in a pop-up window on the subscriber's display while the subscriber is actively connected to the Internet. Further, various disposition options are presented to the subscriber which, upon selection, determine the handling of the incoming call.

With such systems, it would be desirable to have an audible alert associated with the calling party. Further, users would appreciate being able to configure a particular sound file to be played according to the incoming telephone number of the calling party.

One attempt at solving this problem was presented by Caller EyeDee by dazil Internet Services. Caller EyeDee appears to permit configured ring sounds (i.e., .wav files) for each individual caller, e.g., "It's Dave Calling". However, Caller EyeDee apparently does not function while the called party is connected to the Internet via a dial-up connection using a modem because, for instance, Caller EyeDee does not send caller identification information via TCP/IP. Essentially, Caller EyeDee has moved the caller ID functionality from customer premises equipment (CPE) to a personal computer. Additionally, Caller EyeDee apparently requires specialized hardware in the form of a modem that supports Caller ID. Thus, Caller EyeDee is not an effective solution.

The present invention overcomes the problems associated with the prior art.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout several views of the drawings, and in which.

DETAILED DESCRIPTION OF THE EMBODIMENTS

In view of the foregoing, the present invention, through one or more of its various aspects and/or embodiments is thus presented to provide a customized audible alert Internet caller identification system that operates within an AIN environment.

Accordingly, one aspect of the present invention is to provide a method for allowing a subscriber connected to the Internet to receive a customized call alert associated with an incoming call from a calling party to the subscriber. The method includes receiving the incoming call at a terminating switch, suspending the call at the terminating switch, launching a query in response to a request from the calling party to establish a connection with the subscriber, and accessing a service control point (SCP) in response to the query. The method further includes determining whether the subscriber is actively connected to the Internet. Upon ascertaining that the subscriber's Internet status is active, identification information associated with the called party is determined. Then, a message is sent from an Internet caller identification server (ICID), via the Internet, to client software on the subscriber's computer, which includes notification and caller identification information associated with the incoming call. The method further includes initiating a sound file associated with the caller identification information.

The caller identification information may include a name of the calling party and/or a telephone number of the calling party. Further, the initiating includes determining whether the name of the calling party and/or the telephone number of the calling party points to a unique sound file.

The caller identification information may include an indication that a name of the calling party and a telephone number of the calling party are not available. In this regard, the initiating may include determining whether the indication points to a unique sound file.

The caller identification information may include a notification that the incoming call has been screened by a privacy manager feature on the subscriber's line. In this regard, the initiating may include determining whether the notification points to a unique sound file.

The method may further include receiving the subscriber's disposition selection at the ICID server via the Internet and handling the call in response to the subscriber's disposition selection.

With the present invention, the subscriber may be connected to the Internet via a dial-up connection or an xDSL connection.

According to another aspect of the present invention, a computer readable medium is provided for storing a computer program that allows a subscriber connected to the Internet to receive a customized call alert associated with an incoming call from a calling party to the subscriber. The computer readable medium includes a receiving source code segment that receives caller identification information from an Internet caller identification (ICID) server, a determining source code segment that determines whether a calling party name and/or a calling party number point to a unique sound file, and a launching source code segment that launches the unique sound file associated with the caller identification information.

The caller identification information includes a name of the calling party and/or a telephone number of the calling party. The computer readable medium may also include an associating source code segment that associates the unique sound file with the name of the calling party and/or the telephone number of the calling party.

The caller identification information may include an indication that a name of the calling party and a telephone number of the calling party are not available. As a result, the computer readable medium includes an associating source code segment that associates the unique sound file with the indication that a name of the calling party and a telephone number of the calling party are not available.

The caller identification information may include a notification that the incoming call has been screened by a privacy manager feature on the subscriber's line. As a result, the computer readable medium includes an associating source code segment that associates the unique sound file with the notification.

The computer readable medium further includes a presenting source code segment that presents the caller identification information and call disposition options to the subscriber. Further, the computer readable medium includes an accepting source code segment that accepts the subscriber's disposition selection. The computer readable medium also includes a sending source code segment that sends the subscriber's disposition selection to the Internet caller identification server via the Internet.

Further, the subscriber may be connected to the Internet via a dial-up or xDSL connection.

The present invention is an advanced intelligent network (AIN) based system and method that allows a subscriber actively connected to the Internet, via a dial-up or a digital subscriber line (DSL) connection, to receive customized audible alerts concerning an incoming call. That is, the subscriber may associate unique sound files (e.g., .wav, .au, etc.) with telephone numbers from which the subscriber expects to receive calls. As a result, a subscriber with an active Internet connection will audibly receive a unique sound file associated with a calling party number (CPN). For example, the unique sound file may be audibly received through speakers connected to the subscriber's personal computer (PC).

In addition, the subscriber may also receive visual caller identification information concerning an incoming telephone call. The visual information may be provided via a pop-up dialog box on the subscriber's display, which includes but is not limited to a monitor of a PC. The information displayed to the subscriber includes a telephone number and name, if available, of the calling party. In addition, several disposition options are presented to the subscriber which, upon selection, determine the handling of the incoming call.

The disposition options available to the subscriber include, for example, accepting the call, forwarding the call to a voice mail system, redirecting the call to another telephone line (e.g., a cellular telephone or a second telephone line), and playing an announcement to the calling party. The announcement played to the calling party is selected by the subscriber and may be either a message informing the calling party that the party they are trying to reach is busy and that the caller should call back later, or a message informing the calling party that the party they are trying to reach is busy and will call them back later. Still further, the called party may ignore the call and send it to a busy tone announcement. The subscriber has the option of selecting the language in which the messages plays to the calling party, e.g., English or Spanish.

As used herein, xDSL refers to the different variations of DSL such as asymmetric digital subscriber line (ADSL), high bit-rate digital subscriber line (HDSL), etc.

Figure 1:
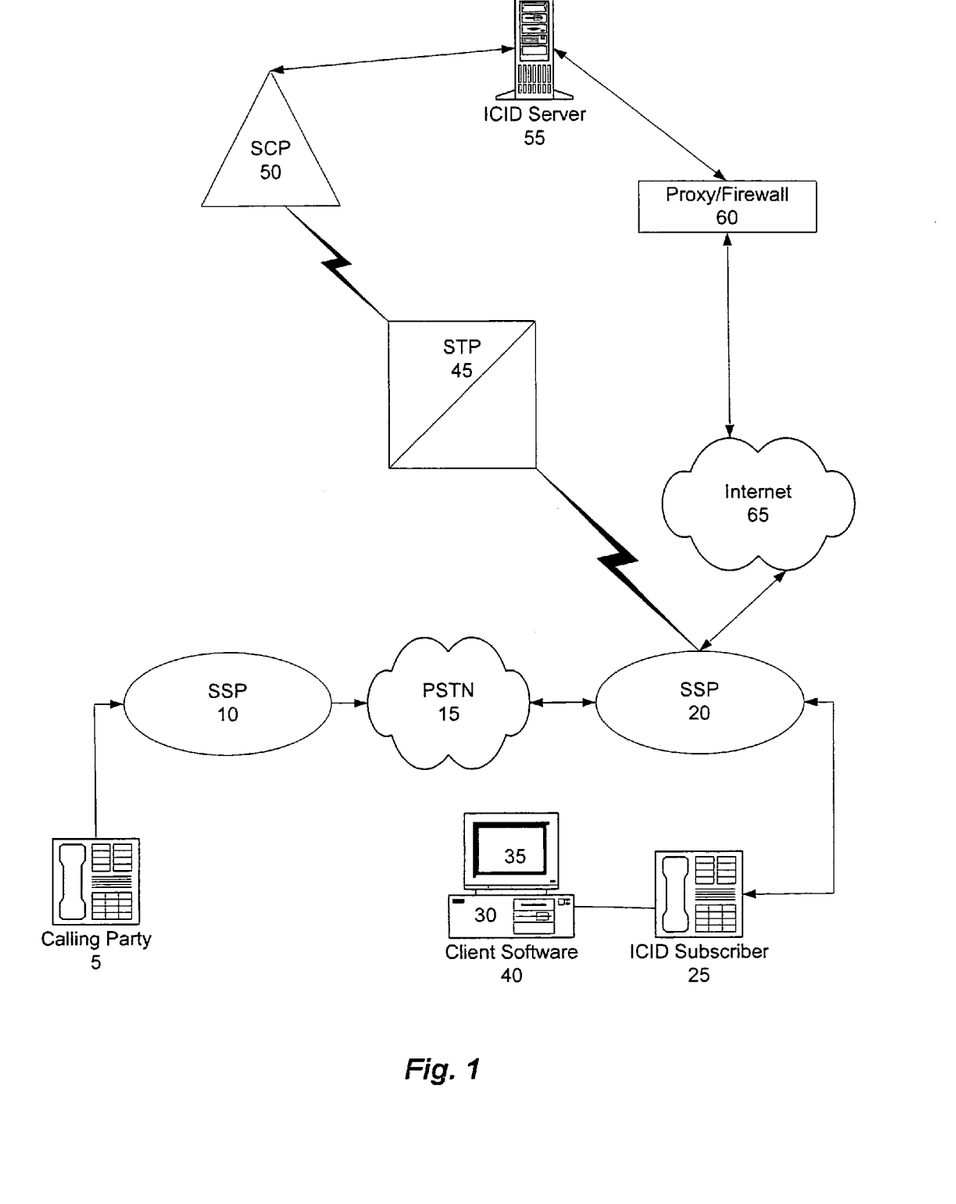
FIG. 1 is a functional block diagram showing an exemplary telecommunications network, according to an aspect of the present invention.

FIG. 1 is a functional block diagram showing an exemplary telecommunications network 1 of the present invention. The network 1 includes a calling party 5, an originating Service Switching Point (SSP) 10, the public switched telephone network (PSTN) 15, a terminating SSP 20, a subscriber's telephone 25, a subscriber's PC 30, a display 35, and ICID client software 40. The network also includes a Signaling Transfer Point (STP) 45, a Service Control Point (SCP) 50, an ICID server 55, a secure proxy server/firewall 60, and the Internet 65. To ensure reliability and survivability of the network, a minimum of two ICID servers and two SCPs may be deployed.

The SSP 10 is the originating central office (CO) for the calling party 5 and the SSP 20 is the terminating CO for the ICID subscriber 25; although, the terminating CO and originating CO may be the same. The SSPs 10 and 20 may comprise, for example, 5ESS switches manufactured by Lucent Technologies, Inc., or DMS-100 switches manufactured by Nortel Networks Corporation (Nortel), or AXE-10 switches manufactured by Telefonaktiebolaget LM Ericsson. Although, any compatible SSPs with equivalent capabilities could be incorporated.

The 5ESS switches may utilize an AIN Release 0.1 protocol and should be equipped with Generic 5E12 (or higher)

software and associated AIN SSP features. The DMS-100 switches (release NA009) may utilize an AIN Release 0.1 protocol and associated AIN SSP features. The AXE-10 switches may utilize an AIN Release 0.1 protocol and should be equipped with Generic 8.07 (or higher) software and associated AIN SSP features. The call service logic of the present invention may be upgraded to accommodate future AIN releases and protocols and future trigger types. Specifications of AIN Release 0.1 SSPs may be found in Bellcore TR-NWT-001285, Switch-Service Control Point (SCP) Application Protocol Interface Generic Requirements, the disclosure of which is expressly incorporated by reference herein in its entirety.

In order to implement ICID with customized audible alerts, a Termination Attempt Trigger (TAT) is assigned to an ICID subscriber's directory number (DN) or line, depending upon the type of switch. Once the trigger has been assigned and activated, every terminating call to the ICID subscriber's line will cause the SSP 20 to suspend the call and send an AIN query message, via the existing Signaling System 7 (SS7) network (and appropriate STPs 45), to the ICID subscriber's serving SCP for instructions. The STP 45 recognizes SSP point codes and sends AIN queries to the appropriate SCP, based on translation type number and/or the numbering plan area-central office code (NPA-NXX) of the called party. The SCP 50 receives the TAT query from the SSP 20, as well as receives and sends information from and to other network elements. The TAT query may be sent in a transactional capabilities application part (TCAP) message. The exemplary embodiments described herein are described in the Advanced Intelligent Network Switching Systems Requirements (GR-1298-CORE) and the Advanced Intelligent Network Generic Requirements: Switch-Service Control Point Adjunct Interface (GR-1299-CORE), the disclosures of which are expressly incorporated by reference herein in their entireties.

The SCP 50 uses a customer name (CNAME) database in the SCP 50 to retrieve calling party name information associated with the calling party's telephone number for transmission to the ICID subscriber. Alternatively, the SCP 50 may use a line information database (LIDB), not shown, to retrieve calling party name information associated with the calling party's telephone number for transmission to the ICID subscriber. In this case, the interface between the LIDB and the SCP 50 may be, for example, the Bellcore GetData query provided over the SS7 network. Detailed information about the GetData interface may be obtained in Bellcore GR-2838-CORE, Generic Requirements for GetData, the disclosure of which is expressly incorporated by reference herein in its entirety.

The SCP 50 ICID logic recognizes subscriber registration information received from the client software via the ICID server 55 and stores information related to the subscriber's online status. The SCP 50 stores a subscriber key and the subscriber's personal identification number (PIN). The subscriber key is a key generated by the client software for encrypting session initiation protocol (SIP) messages sent to the ICID server 55 during session registration, newly formed each session by concatenating the values of the subscriber's IP address and call ID value.

In one possible implementation, if it is determined by the SCP 50 that the subscriber is online, the SCP 50 may query a local number portability (LNP) database, in a known manner, to determine if the calling party number received in the TAT query has been ported. The telephone number received in a response from the LNP database is used to determine the calling party name, when it is available.

To utilize the service, the subscriber obtains and installs the client software 40 on the PC 30 and activates the service as instructed. The client software 40 may be, for example, downloaded via the Internet from the subscriber's telecommunications carrier. The client software 40 supplies an audible and a visual alert to the subscriber of an incoming call, provides call disposition selections to the caller, and sends the subscriber's disposition selection to the ICID server 55. Further, the client software is configured with the IP address of the ICID server 55, to which it sends Internet registrations.

Essentially, when the subscriber logs into the Internet 65, the client software 40 routes subscriber data including the Internet port number to the IP address of the proxy server 60. The proxy server 60 routes calls from the Internet 65 to the ICID server 55 and from the ICID server 55 to the Internet 65. The proxy server 60 is configured to allow the encrypted registration messages to route to alternating service nodes. That is, the subscriber's encrypted personal identification number (PIN), client key/DN, IP address, and xDSL bit are routed through the Internet Service Provider (ISP) to the ICID server 55 via transport control protocol/Internet protocol (TCP/IP), in the form of an SIP message, for registration. The ICID server 55 receives and decrypts the SIP registration message and performs authentication, including initiating a SIP over TCP/IP to the appropriate SCP, which recognizes the subscriber registration information. The client software version number is sent in the encryption header field of the SIP register message and is validated against a value in the ICID properties file. If it is determined that the subscriber does not have the latest version of the software, a message indicating this condition is transmitted to the subscriber.

The ICID server 55 comprises a service node equipped with ICID server software that is used to communicate between the SCP 50 and the ICID client software 40 on the subscriber's PC 30, via SIP over dynamic TCP/IP sessions. The ICID server 55 supports multithreading and has one TCP/IP port for incoming registration messages from client software 40, and one TCP/IP port for SIP invite call notification messages from each SCP. An exemplary ICID server comprises, for example, a compact service node (CSN) or IBM server. For example, an exemplary ICID server may employ SCP/CSN Release R03 or higher on a Solaris 2.6 system and runs software coded in Java provided by Sun Microsystems. The ICID server 55 is configured with one primary SCP IP address and port number for sending SIP register messages that contain the subscriber's IP address. A secondary SCP IP address and port number of an alternate SCP is also configured should the ICID server 55 not be able to register with its designated SCP.

As discussed, the ICID server 55 receives and encrypts information related to ICID incoming calls from the SCP and passes this information to the ICID subscriber via the Internet. Further, the ICID server 55 receives and decrypts the ICID subscriber's disposition selection and passes it to the SCP 50 via TCP/IP.

During registration, an SIP user agent server (UAS) on the subscriber's PC 30 dynamically opens a TCP/IP socket connection with the ICID server 55 using a preconfigured port number on the proxy server and the proxy server's IP address, which is configured in the client software 40. If the first registration fails, the client will attempt to connect with a secondary ICID proxy server. When the proxy server 60 attempts to register with a first ICID server that fails, the proxy server 60 will re-try the registration using another ICID server, derived from a list of available ICID servers. When the client is activated and a point-to-point (PPP) session is established between the subscriber's PC 30 and the ISP, the client dynamically establishes a TCP/IP socket to the ICID server 55. This SIP register request is encrypted. Upon successful registration, the ICID server 55 passes the encrypted SIP message to the client. Then, the client software 40 decrypts the successful registration message and stores it in memory.

The ICID server 55 interfaces with the SCP 50 using application-layer SIP-9 over dynamic (during registration) and nailed-up (during call notification) TCP/IP connections across the secure intranet or secure wide area network (WAN). The application protocol contains a start message (i.e., SIP invite), a unique identifier (i.e., caller ID) for multiplexing/de-multiplexing, and an Internet IP address that will be used by the ICID server 55 and the SCP 50 for routing purposes.

During registration, the ICID server 55 dynamically opens a TCP/IP session with the SCP 50. The SCP 50 and the ICID server 55 exchange SIP message over TCP/IP using one nailed up socket connection per ICID server. A port at the SCP 50, acting as a server, receives SIP registration messages sent by the subscriber's PC 30 via the ICID server 55. In performing authentication, the SCP 50 determines if the subscriber's DN key exists and validates the subscriber's PIN. If successful, the SCP 50 keeps the IP address and session key. The SCP 50 then passes a registration success message to the ICID server 55. If not successful, an error message is returned to the ICID server 55. Alternatively, the SCP 50 may write the IP address and session key to an Real Time Database (RTDB) table at a registration server. In this case, the SCP 50 attempts to match the TAT DN found in the RTDB table. If a match is made, the IP address and session will be set.

The ICID server 55 then sends the message to the client software 40 via the Internet. A newly created session key for each session is used by the ICID server 55 and the client software to encrypt/decrypt the message body of all SIP messages transmitted between these two components during call notification.

Alternatively, registration may be handled by a separate registration server that communicates with the SCP 50 and/or other network elements. Further, the service may be implemented, for example, through the system disclosed in U.S. patent application Ser. No. 09/545,459 to ADAMS et al., filed on Apr. 7, 2000, the disclosure of which is expressly incorporated by reference herein in its entirety.

Figure 2:
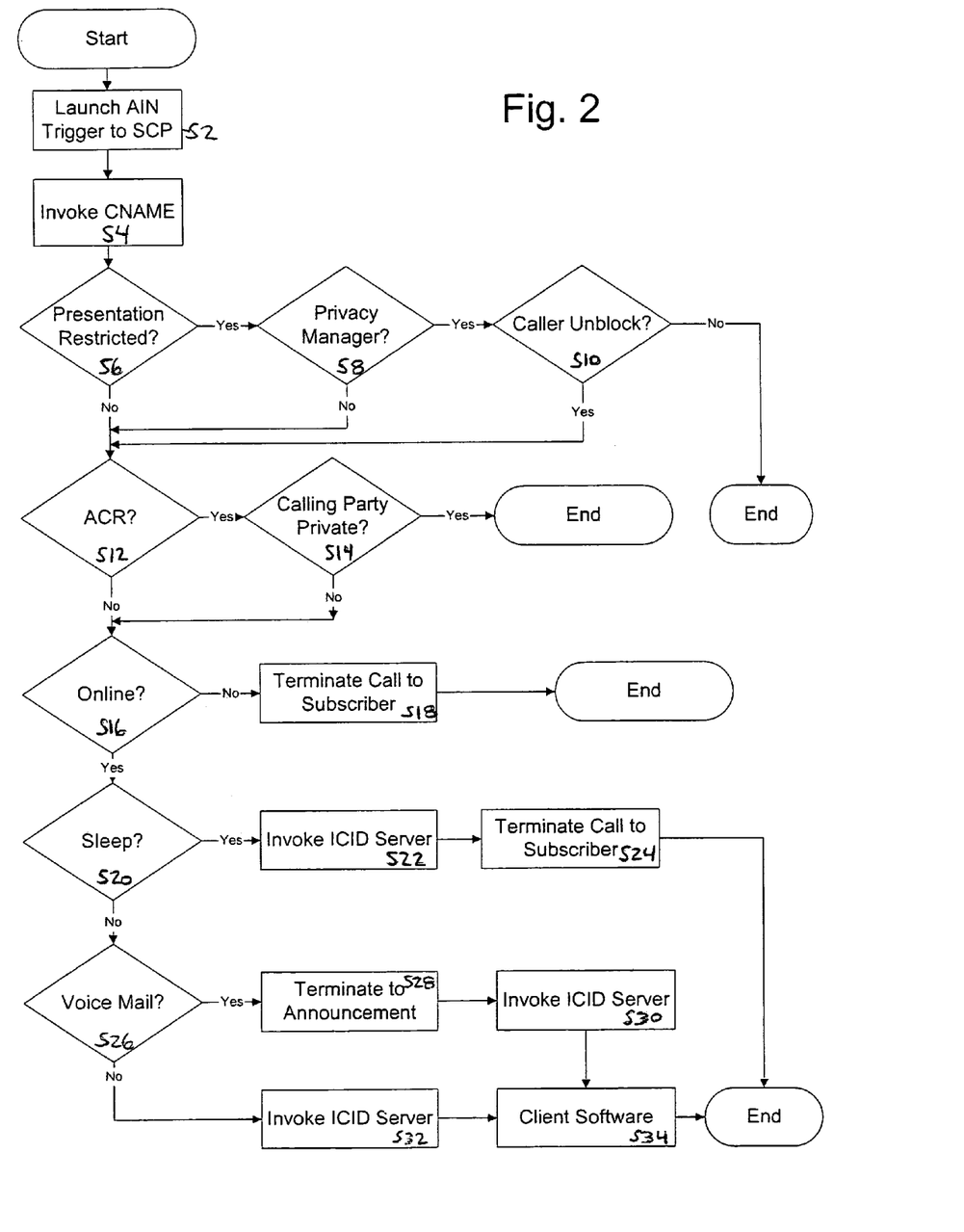
FIG. 2 is an exemplary flowchart diagram of ICID SCP logic, according to an aspect of the present invention.

FIG. 2 shows an exemplary flowchart diagram of the ICID SCP Service Logic, according to an aspect of the present invention. At step s2 a query, including the called party's telephone number, is received by the SCP 50. The service logic then will recognize whether the subscriber has AIN calling name subscription. If the NPA-NXX is out of region, the SCP 50 will invoke a calling name request through SCP CNAME logic via a query to a CNAME database, or alternatively a LIDB, at step s4 (subject to an agreement between telecommunications carriers). As a result, the calling party name, if available, will be passed to the client software 40. At step s6, a determination is made as to whether the call has a presentation restriction (PR) value that is restricted or unavailable. If a call is received with a PR value of anonymous, a determination is made at step s8 as to whether the subscriber has a privacy manager feature. If the subscriber has a privacy manager feature, the caller is given the opportunity to remove the anonymous PR value at step s10. If the caller does not remove the anonymous PR value at step s10, the call is sent to an appropriate announcement and then is disconnected. If the subscriber does not have the privacy manager feature, or if the caller removes the anonymous PR value, processing continues at step s12. Or at step s6, if the call does not have a PR value, then processing continues at step s12.

At step s12, a determination is made as to whether the subscriber has anonymous call rejection (ACR). If the subscriber has ACR, a determination is made at step s14 as to whether the call has a PR value of private. If the call has a PR value of private, then the call is sent to an appropriate announcement and then is disconnected. If a private PR value for the call is not found, or if the caller does not have ACR, then processing continues at step s16.

At step s16, a determination is made as to whether the subscriber is online with an active Internet connection. If the subscriber is not online with an active Internet connection, the SCP 50 will send an authorize termination response to the SSP and the call to the subscriber's line is terminated at step s18. If it is determined at step s16 that the subscriber is online with ICID turned ON, then the SCP 50 will instruct the SSP to play a "please hold" announcement to the caller. Alternatively, the determination of whether the subscriber is online with an active Internet connection may be made prior to the determination of whether the subscriber has ACR.

At step s20, a determination is made as to whether a sleep bit is set for the subscriber. A sleep condition occurs when an xDSL subscriber is not currently active with an Internet session. If a sleep bit is set, then the SCP 50 sends the caller ID information to the ICID server 55 at step s22, which is passed to the subscriber via TCP/IP as the call is terminated to the caller's line at step s24. The caller ID information is stored in the subscriber's caller ID log, as will be shown later. If it is determined at step s20 that a sleep bit is not set, then processing continues at step s26.

At step s26, a determination is made as to whether the subscriber has activated a voice mail feature that directs all incoming calls the a voice mail platform. If the voice mail feature is active, then the "please hold" announcement is discontinued and an announcement is played to the caller at step s28 indicating that the call is being transferred to voice mail. Additionally, the SCP 50 sends the caller ID information to the ICID server 55 at step s30, which is passed to the client software at step s34 via TCP/IP and is stored in the subscriber's caller ID log, as will be shown later. Additionally, the call is directed to the subscriber's voice mail. If the subscriber has not activated a voice mail feature, or does not have one, then the "please hold" announcement is discontinued and the SCP 50 sends the caller ID information to the ICID server 55 at step s32, which is passed to the client software 40 at step s34 via TCP/IP and is stored in the subscriber's caller ID log. The caller identification information is presented to the caller with an audible alert, as will be discussed. Additionally, the caller is presented with a plurality of call disposition options.

Figure 3:
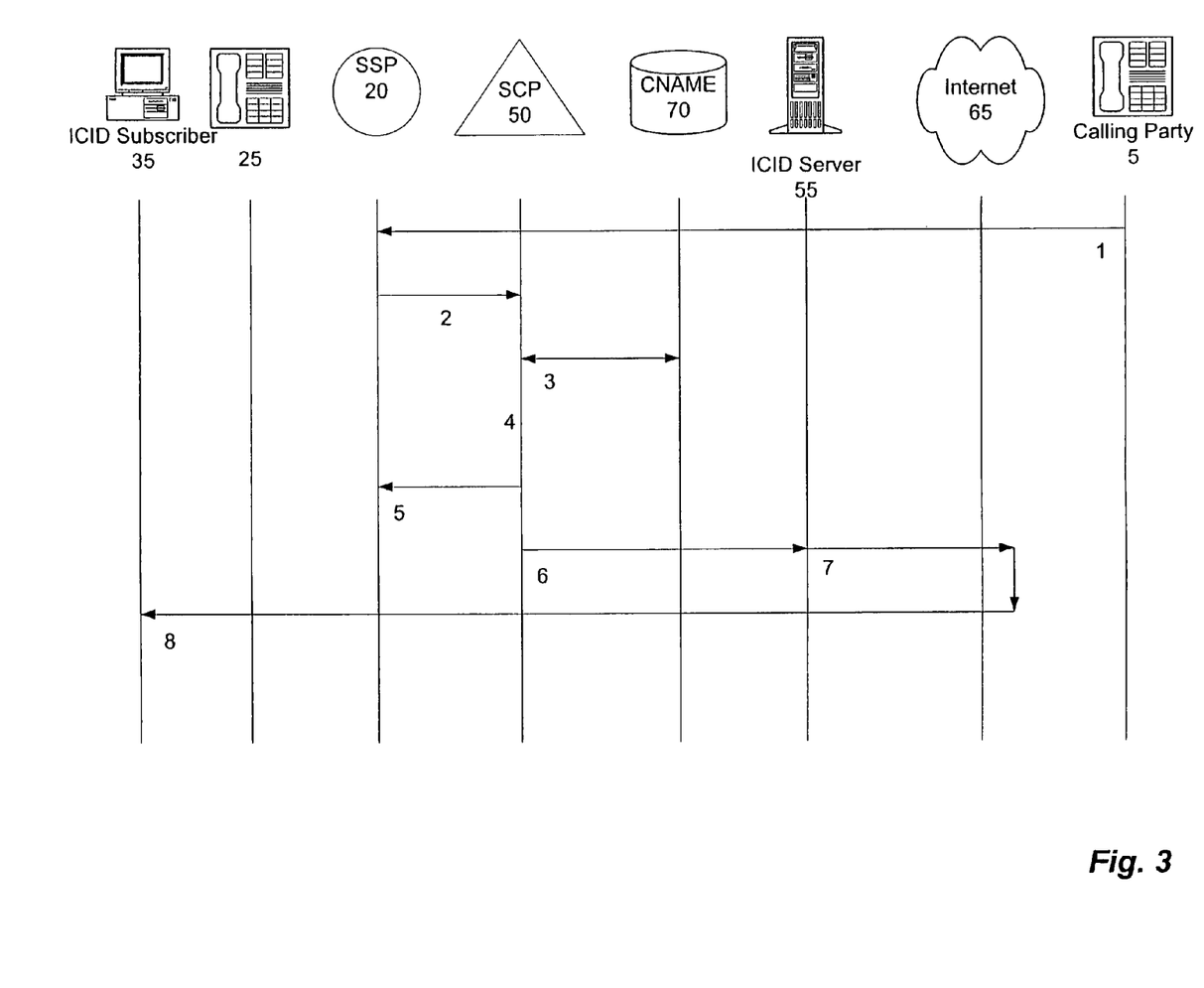
FIG. 3 is an exemplary ICID call flow diagram for an ICID subscriber, according to an aspect of the present invention.

FIG. 3 is an exemplary ICID call flow for an ICID subscriber. At step 1, a telephone call is placed to an ICID subscriber. A TAT in the terminating CO SSP 20 causes the call to be suspended at the SSP 20 at step 2 to determine the subscriber's online status. The trigger also causes the SSP 20 to transmit an AIN query message including the CPN (if available) and CDN via the SS7 network and the appropriate STPs to the ICID subscriber's serving SCP 50. If the subscriber is not online or has the ICID turned OFF, the SCP 50 sends an Authorize_Termination response to the SSP 20, that will terminate the call to the subscriber's line. As the calls attempts to terminate, it will encounter any features programmed on the ICID subscriber's line, e.g., call waiting, call forwarding, etc.

At step 3, the SCP 50 does a lookup for the CNAME in a CNAME database 70 if the CPN was delivered with the query and the presentation restriction indicator for the incoming call is "allowed". Alternatively, the SCP 50 may perform a lookup in a LIDB (not shown). If the NPA-NXX is out of region and the telecommunications carrier has an agreement with the carrier in that region, the SCP 50 will re-query for the name. If no agreement exists, the state name (e.g., "Texas Call") is the default. If a call is received with a presentation restriction indicator of "anonymous" and the ICID subscriber has a privacy manager feature on their line, a privacy manager screen (not shown) may be displayed to the subscriber. If a call is received with a presentation restriction indicator of "private" and the ICID subscriber has anonymous call rejection (ACR), then the SCP 50 will not continue with the SCP logic will invoke ACR processing.

At step 4, the SCP 50 checks to see if the called party, using the CDN, is a subscriber to the ICID service, or to the ICID customized audible alert service. Also at step 4, the SCP 50 determines if the subscriber is online and if the subscriber has provisioned that incoming calls be directed to voice mail or forwarded to an alternate number. The SCP 50 also determines whether the subscriber is connected to the Internet via xDSL connection. If the subscriber is connected to the Internet via an xDSL connection, the SCP 50 checks to see if a sleep bit is set. A sleep condition exists when an xDSL user is not currently active in their Internet session. If the sleep bit is set, the calling party is automatically routed to the subscriber's phone to ring. If the subscriber is online, with ICID service active, the IP address, port number and ICID subscriber information variables are populated at step 4.

At step 5, the SCP 50 instructs the SSP 20 to play a "please hold" announcement to the calling party. At step 6, the SCP 50 sends an SIP invite request to the ICID server 55. The SIP invite request contains the CDN, CPN if available and not presentation restricted(CPN), calling party name (if available and not presentation restricted), subscriber's IP address, and session key. At step 7, the ICID server 55 formats an Internet message to the client software 40 on the ICID subscriber's PC 30 that causes a sound file to be played to the subscriber at step 8. In addition, the message causes a screen to be displayed on the subscriber's monitor, informing them of the incoming call (i.e., calling name and calling number) and presenting them with several call disposition options.

If a dial-up subscriber elects to accept the call, the client software 40 responds to the ICID server 55 with an SIP message, sends a de-registration request to the SCP 50, and begins to terminate the subscriber's Internet session. As a result, the SCP 50 instructs the SSP 20 to discontinue the "please hold" announcement and instructs the SSP 20 to play a "will take your call" announcement, after which the call is terminated to the subscriber's line.

If an xDSL subscriber elects to accept the call, the client software 40 responds to the ICID server 55 with an SIP message and leaves the PC client registered and active. As a result, the SCP 50 instructs the SSP 20 to discontinue the "please hold" announcement and the call is terminated to the subscriber.

If a dial-up or xDSL subscriber elects to send the incoming call to voice mail, the client software 40 sends an SIP message to the ICID server 55 including a forward to number of the subscriber's voice mail platform, which is forwarded to the SCP 50. As a result, the SCP 50 instructs the SSP 20 to discontinue the "please hold" announcement, instructs the SSP 20 to play a "forwarding to voice mail" announcement, and sends a forward to voice mail response to the SSP 20 that initiates the forward to voice mail process.

If a dial-up or xDSL subscriber elects to forward the incoming call to another number, the client software 40 sends an SIP message to the ICID server 55 including a forward to number as selected by the subscriber, which is forwarded to the SCP 50. As a result, the SCP 50 instructs the SSP 20 to discontinue the "please hold" announcement, instructs the SSP 20 to play a "forwarding to another number" announcement, and sends a forward call response to the SSP 20 that initiates the call forwarding process.

If a dial-up or xDSL subscriber elects to send the call to an announcement, the client software 40 sends an SIP message to the ICID server 55 with the subscriber's selection, which is forwarded to the SCP 50. As a result, the SCP 50 instructs the SSP 20 to discontinue the "please hold" announcement and instructs the SSP 20 to play the announcement selected by the subscriber. As discussed earlier, the announcement may advise the calling party that the subscriber will return the call at a later time, or the announcement may request that the calling party attempt the call at a later time. The announcements may be played to the incoming caller in English and/or another language such as Spanish, as determined by the subscriber. After the announcement is played to the incoming caller, the call is disconnected.

If a dial-up or xDSL subscriber elects to ignore the call, the client software 40 sends an SIP message to the ICID server 55 with the subscriber's selection, which is forwarded to the SCP 50. As a result, the SCP 50 instructs the SSP 20 to discontinue the "please hold" announcement. If the subscriber has an active xDSL connection, a busy tone announcement is played to the calling party, after which the call is disconnected. If the subscriber has a dial-up connection, the SCP 50 instructs the SSP 20 to forward the call to voice mail using the forward call response. If the subscriber does not have voice mail, the SCP 50 instructs the SSP 20 to route the call to the subscriber. If the subscriber does not respond within a predetermined time (e.g., 18 seconds), a busy tone announcement is played to the calling party, after which the call is disconnected.

If a dial-up or xDSL subscriber selects a do not disturb option, the client software 40 sends an SIP message to the ICID server 55 with the subscriber's selection, which is forwarded to the SCP 50. As a result, the SCP 50 instructs the SSP 20 to discontinue the "please hold" announcement and no sound file or pop-up window is presented to the subscriber. Instead, the call is logged to the caller ID log and the call is routed to the subscriber's voice mail platform or to the busy tone announcement if the subscriber does not have voice mail.

Associating sound files to telephone numbers and/or names will now be discussed. The subscriber may configure audible call alerts using canned sound files that are automatically downloaded with client software 40 or sound files available from other sources. Further, the subscriber may create their own sound files including, for example, clips from songs, spoken words, downloaded or recorded sounds, etc.

Figure 4:
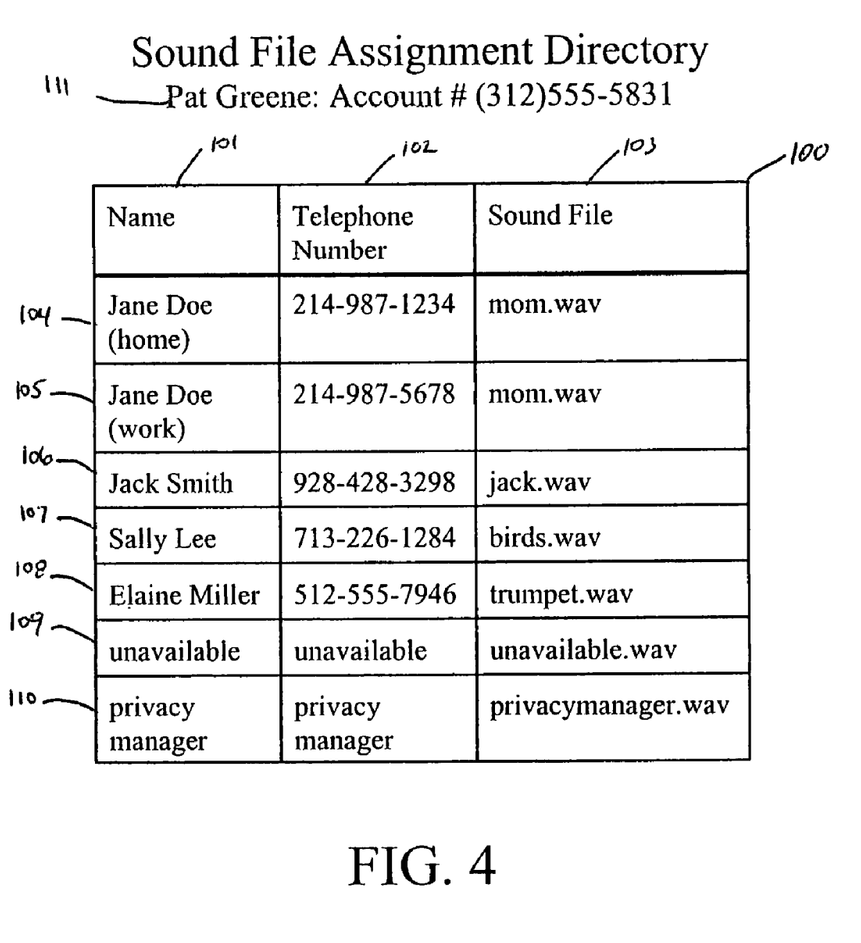
FIG. 4 is an exemplary sound file assignment directory used by the subscriber to associate sound files with telephone numbers, according to an aspect of the present invention.

FIG. 4 illustrates an exemplary sound file assignment directory used by the subscriber to associate sound files with telephone numbers. The sound file assignment directory may be completed using the client software 40. Each record in the directory includes the name and/or telephone number of persons from which the subscriber expects to receive telephone calls. The sound file assignment directory 100 includes a name column 101, telephone number column 102, and a sound file column 103. The sound file assignment directory includes horizontal rows 104, 105, 106, 107, 108, 109, and 110. An account identifier 111 may be provided that identifies the subscriber using, for example, the subscriber's name and account number. The name column 101 includes the names of each person that the subscriber has entered in the directory. That is, in column 101, the subscriber may enter the names of persons from whom the subscriber expects to receive calls. In column 102, the subscriber enters the telephone numbers corresponding to each of the names in column 101. Alternatively, the subscriber may enter just the name or just the telephone number of persons from whom the subscriber expects to receive calls.

The subscriber completes each record in the directory by associating the name and/or telephone number in column(s) 101 and/or 102 with a sound file by entering the name of a sound file in the column 103. For example, referring to row 104, the subscriber assigned a file named "mom.wav" to the their mother's home telephone number. Thus, Jane Doe 214-987-1234 points to the "mom.wav" file. Accordingly, when the Jane Doe, the subscriber's mother, calls the subscriber from home (i.e., calling party number 214-987-1234) and the subscriber is on the Internet, the client software 40 instructs the "mom.wav" file to play, e.g., "It's mom". Additionally, a pop-up window may be displayed to the subscriber on the display 35 containing the telephone number and/or name of the caller and various call disposition options.

The client software 40 permits multiple telephone numbers to point to the same sound file. That is, the subscriber may assign a particular sound file to two or more different telephone numbers and/or names. Referring to row 105, subscriber also assigned the file named "mom.wav" to the their mother's work telephone number. Accordingly, when Jane Doe calls the subscriber from work (i.e., CPN 214-987-5678) and the subscriber is on the Internet, the client software 40 instructs the "mom.wav" file to play, e.g., "It's mom". Additionally, a pop-up window may be displayed to the subscriber on the display 35 containing the telephone number and/or name of the caller and various call disposition options.

Referring to row 109, the subscriber assigned a file named "unavailable.wav" to those calls having names and/or telephone numbers that are unavailable, or otherwise not displayed, e.g., "anonymous", "unavailable", "out of area", "private", etc. Accordingly, when a caller calls with a name and/or telephone number that is not displayable, the client software 40 instructs the "unavailable.wav" file to play, e.g., "Caller identity not available". Additionally, a pop-up window may be displayed to the subscriber on the display 35 indicating "anonymous", "unavailable", "out of area", "private", etc., as well as various call disposition options.

Referring to row 110, the subscriber assigned a file named "privacymanager.wav" to those calls in which a privacy manager screening service applies, i.e., "anonymous", "unavailable", "out of area", "private", etc. With the privacy manager screening service, the callers of these types of calls (i.e., "anonymous", "unavailable", "out of area", "private", etc.) must enter an access code or announce their name before the call is terminated to the subscriber. If the caller announces their name, the client software 40 instructs the "privacymanager.wav" file to play, e.g., "Privacy Manager". Additionally, a pop-up window may be displayed to the subscriber on the display 35 indicating "Privacy Manager", as well as various call disposition options.

Figure 5:
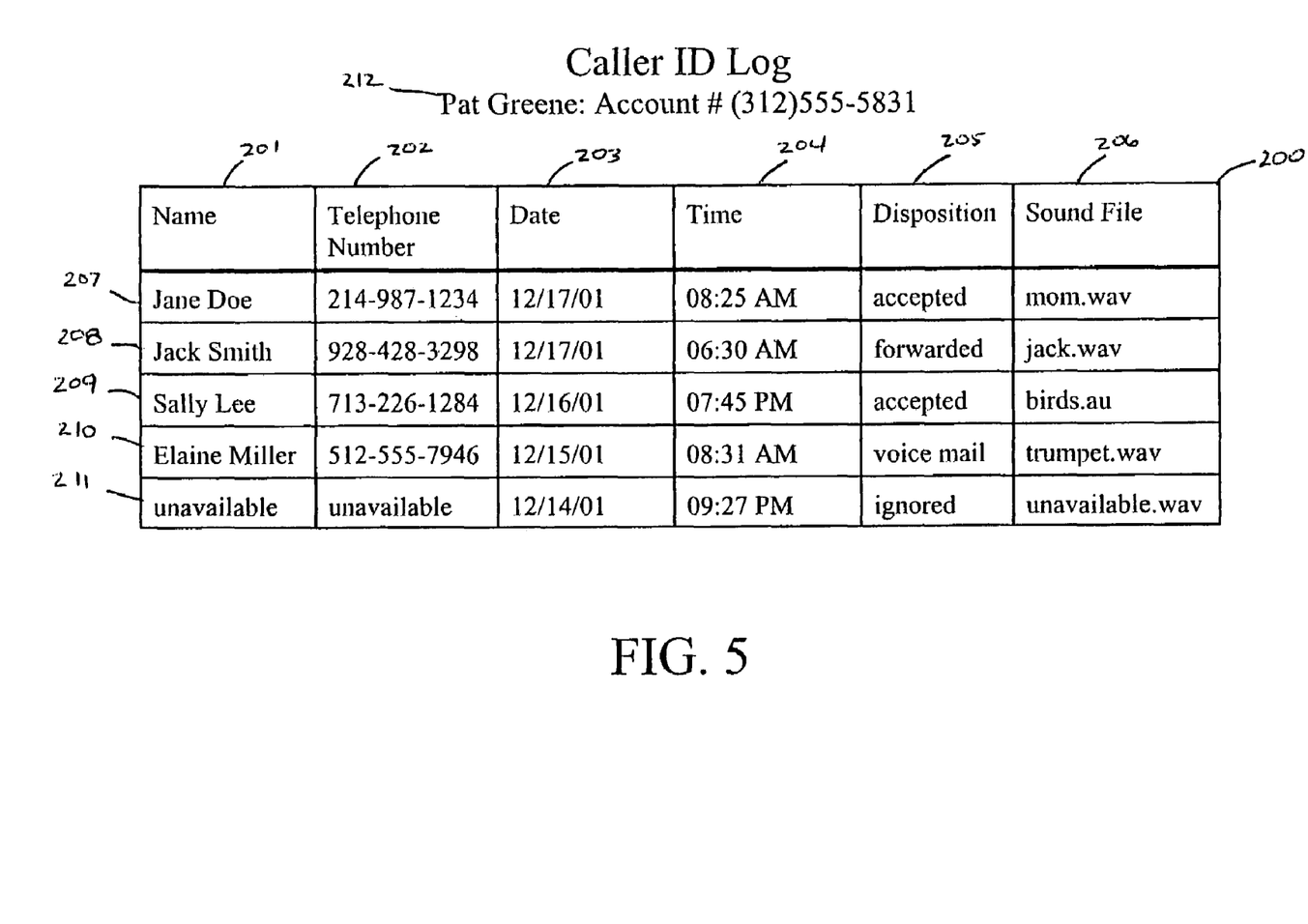
FIG. 5 is an exemplary caller ID log, according to an aspect of the present invention.

FIG. 5 illustrates an exemplary caller ID log. The caller ID log 200 includes a name column 201, telephone number column 202, date column 203, time column 204, disposition column 205, and sound file column 206. The log includes horizontal rows 207, 208, 209, 210 and 211. An account identifier 212 may be provided that identifies the subscriber using, for example, the subscriber's name and account number. The client software receives and stores caller identification information for every incoming call in the appropriate column of the caller ID log 200. The caller ID log 200 displays the calls to the subscriber's line, including the name and telephone number of the calling party (if available), the date and time of the call, the disposition chosen by the subscriber, and the sound file that played. Using a tool associated with the client software 40, the subscriber may extract information from the caller ID log 200 to populate the sound file assignment directory 100 shown in FIG. 4.

Figure 6:
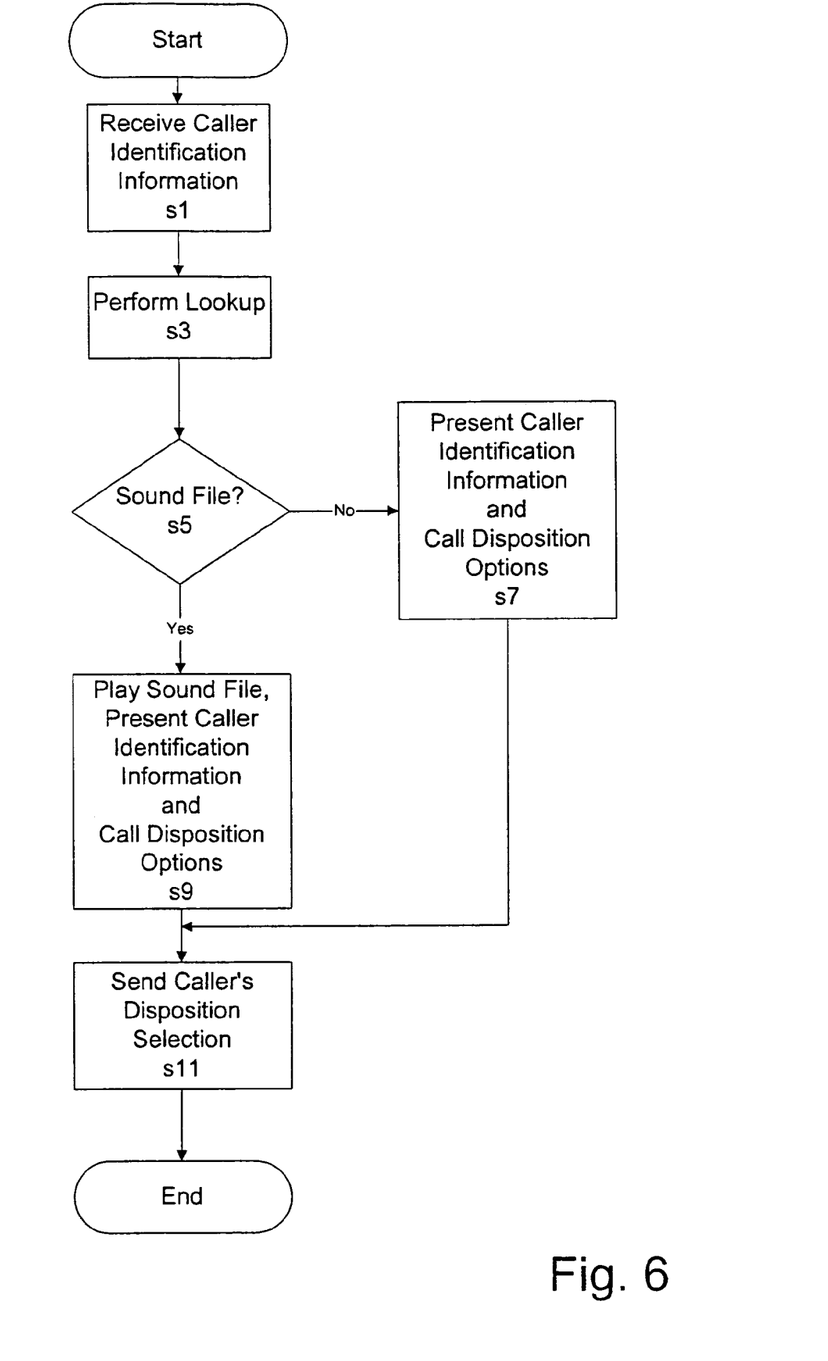
FIG. 6 is an exemplary flowchart diagram of ICID audible alert call processing, according to an aspect of the present invention.

FIG. 6 is an exemplary flowchart diagram of ICID audible alert call processing, according to the present invention. At step s1, the client software 40 receives the caller identification information via TCP/IP from the ICID server 55. At step s3, the client software 40 performs a lookup in the sound file assignment directory, for example, to ascertain whether the incoming CPN points to a particular sound file, as assigned by the caller. If no associated sound file is found for a calling party number, the client software directs caller identification information, if available, to be presented to the subscriber via a pop-up window at step s7. If a sound file associated with the incoming CPN is located at step s5, the client software 40 directs the assigned sound file to be played at step s9. The subscriber may also receive caller identification (i.e., CPN and name), if available, via a pop-up window, for example, on the subscriber's display 35. In either instance (i.e., step s7 or step s9), the subscriber is presented with various call disposition options. As previously discussed, the disposition options available to the subscriber include accepting the call, ignoring the call, sending the call to voice mail, forwarding the call to an alternate number, sending the call to an announcement informing the caller to try the caller later, sending the call to an announcement advising the caller that the subscriber will return the caller's call later, etc. At step s11, the subscriber selects a call disposition option that is forwarded to the ICID server 55 via TCP/IP. The subscriber may toggle the audible alert ON or OFF as desired, using the client software 40.

As a result, the service allows a subscriber to predetermine the sound file that plays, according to the CPN, when they receive a call while being actively connected to the Internet.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., TCP/IP, UDP/IP, HTML, SHTML, DHTML, XML, PPP, FTP, SMTP, MIME); peripheral control (IrDA; RS232C; USB; ISA; ExCA; PCMCIA), & public telephone networks (ISDN, ATM, xDSL) represent examples of the state of the art. Such standards are periodically superseded by faster or more efficient equivalents having essentially the same functions. Accordingly, replacement standards and protocols having the same functions are considered equivalents.

What is claimed is:

1. A method for allowing a user connected to the Internet to receive a customized call alert associated with an incoming call from a calling party to the user, comprising:
   providing software on a device of the user for:
   determining that the user is actively connected to the Internet via an always on connection;
   receiving a message including identification information associated with the calling party, via the Internet;
   initiating a user selectable sound file associated with the identification information sent with the message;
   presenting the user with a plurality of selectable call disposition options associated with the calling party; and
   sending the user's selected option to an Internet caller identification (ICID) server.

2. The method according to claim 1, wherein the identification information comprises at least one of a name of the calling party and a telephone number of the calling party.

3. The method according to claim 2, wherein the initiating comprises determining whether the at least one of the name of the calling party and the telephone number of the calling party is associated with a unique sound file.

4. The method according to claim 1, wherein the identification information comprises an indication that a name of the calling party and a telephone number of the calling party are not available.

5. The method according to claim 4, wherein the initiating comprises determining whether the indication is associated with a unique sound file.

6. The method according to claim 1, wherein the identification information comprises a notification that the incoming call has been screened with a privacy manager feature.

7. The method according to claim 6, wherein the initiating comprises determining whether the notification is associated with a unique sound file.

8. The method according to claim 1, further comprising processing the incoming call in response to the call disposition option selected by the user.

9. The method according to claim 1, wherein the always on connection comprises an xDSL connection.

10. A computer readable medium for storing a computer program on the device of a user that allows the user connected to the Internet to receive a customized call alert associated with an incoming call from a calling party to the user, said medium comprising:
    a sound file determining code segment that determines whether the identification information associated with the calling party is associated with a unique sound file selected by the user, the determination being made when the user is actively connected to the Internet via an always on connection;
    a launching code segment that launches the unique sound file based on identification information associated with the calling party;
    a presenting code segment that presents the user with a plurality of call disposition options associated with the calling party; and
    a sending code segment that sends the user's selected option to an Internet caller identification (ICID) server.

11. The computer readable medium according to claim 10, wherein the identification information comprises at least one of a name of the calling party and a telephone number of the calling party.

12. The computer readable medium according to claim 11, further comprising an associating code segment that associates the unique sound file with the at least one of the name of the calling party and the telephone number of the calling party.

13. The computer readable medium according to claim 10, wherein the identification information comprises an indication that a name of the calling party and a telephone number of the calling party are not available.

14. The computer readable medium according to claim 13, further comprising an associating code segment that associates the unique sound file with the indication.

15. The computer readable medium according to claim 10, wherein the identification information comprises a notification that the incoming call has been screened with a privacy manager feature.

16. The computer readable medium according to claim 15, further comprising an associating code segment that associates the unique sound file with the notification.

17. The computer readable medium according to claim 10, further comprising a presenting code segment that presents the identification information to the user.

18. The computer readable medium according to claim 10 further comprising an accepting code segment that accepts a disposition option selected by the user.

19. The computer readable medium according to claim 10, wherein the always on connection comprises an xDSL connection.

* * * * *